No. 795,688. PATENTED JULY 25, 1905.
H. S. CANE.
LATHE FOR HOLLOW WOODENWARE AND THE LIKE.
APPLICATION FILED MAY 8, 1905.
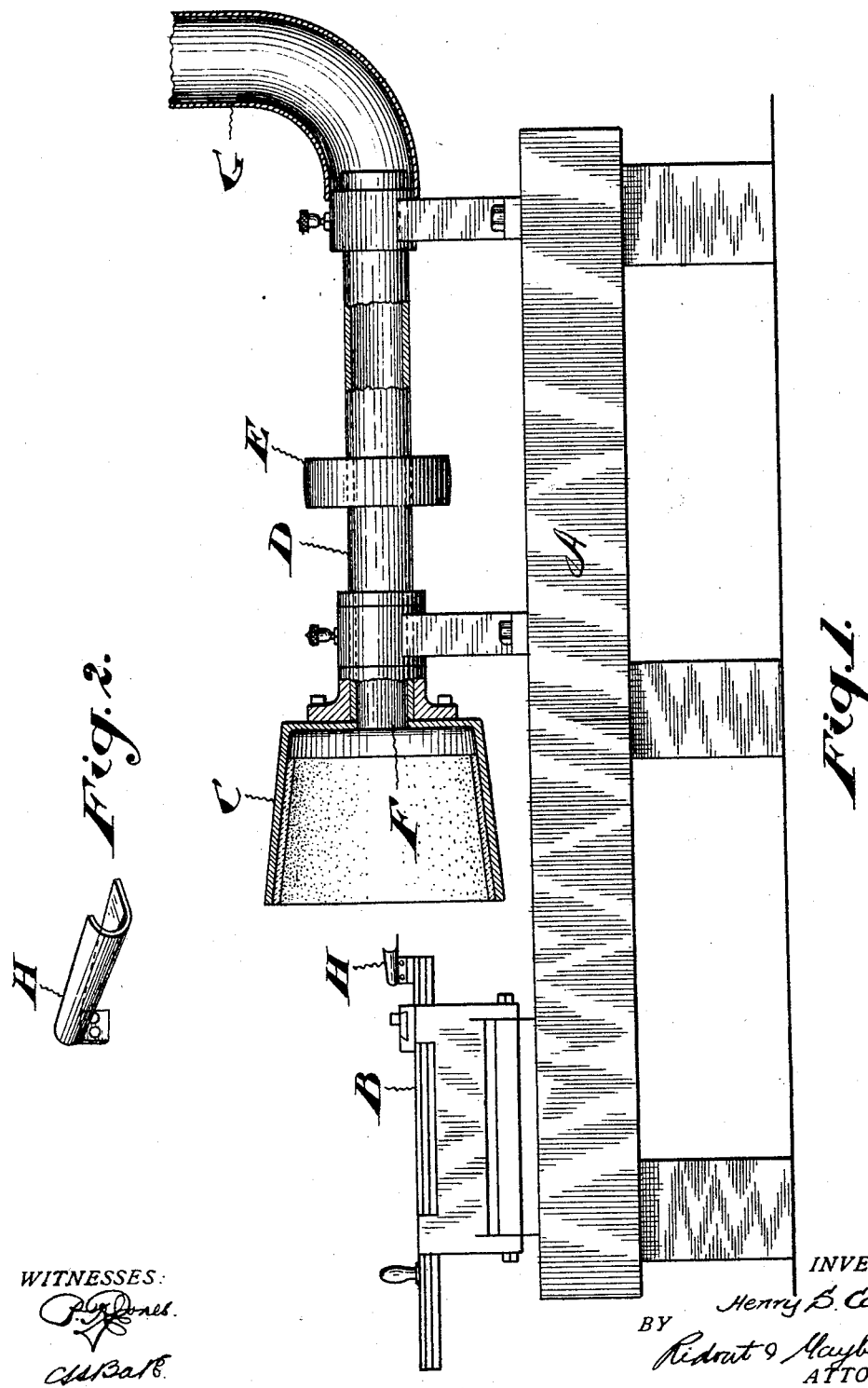
WITNESSES:
INVENTOR.
Henry S. Cane
BY
Ridout & Maybee
ATTORNEYS.

UNITED STATES PATENT OFFICE.

HENRY S. CANE, OF NEWMARKET, CANADA, ASSIGNOR TO UNITED FACTORIES, LIMITED, OF TORONTO, CANADA.

LATHE FOR HOLLOW WOODENWARE AND THE LIKE.

No. 795,688.      Specification of Letters Patent.      Patented July 25, 1905.

Application filed May 8, 1905. Serial No. 259,423.

*To all whom it may concern:*

Be it known that I, HENRY S. CANE, of the town of Newmarket, in the county of York, Province of Ontario, Canada, have invented certain new and useful Improvements in Lathes for Hollow Woodenware and the Like, of which the following is a specification.

The object of my invention is to devise a lathe for turning hollow woodenware which will obviate the trouble now experienced owing to the dust and turnings from the inside of the work being thrown outwardly into the face of the operator; and it consists, essentially, in making an opening through the end of the chuck of the lathe communicating with the interior of a hollow mandrel, the other end of the mandrel communicating with a suitable suction-pipe, substantially as hereinafter more specifically described and then definitely claimed.

Figure 1 is a side sectional elevation of my improved lathe. Fig. 2 is a perspective detail of the guide or shield for directing the turnings inward.

In the drawings like letters of reference indicate corresponding parts in the different figures.

In its general arrangement my lathe is similar to those in general use for turning hollow woodenware, such as pails, tubs, and the like.

A is the bed; B, the tool-rest carriage; C, the hollow chuck; D, the mandrel, and E the driving-pulley.

In ordinary lathes the turnings and dust from any pail or tub inserted in the chuck are discharged outwardly and fly into the face of the operator. This makes the occupation of turning the insides of pails and tubs exceedingly arduous, and it is very difficult to secure operators for this class of machine. Further, the turnings accumulate in heaps upon the floor and have to be removed by manual labor, thus adding both trouble and expense.

In my improved lathe I provide an opening F in the end of the hollow chuck. I also increase the size of the mandrel D and make it hollow, the interior diameter being preferably about six inches, though, of course, this may vary considerably, depending on the size of the work for which the lathe is intended and partly on the amount of suction available.

G is a suction-pipe connected with the end of the mandrel, preferably by being sleeved onto the rear journal-box of the mandrel. This suction-pipe communicates with any suitable suction-system such as commonly employed in the removal of dust, shavings, and the like from machinery.

On the tool-rest on the lathe is fitted a curved guide or shield H, which is directed diagonally forward from the tool, so as to direct the flying turnings and dust into the interior of the work being operated on and thence toward the opening F in the end of the chuck. Constant suction being maintained in the suction-pipe G, all the turnings and dust are drawn through the hollow mandrel and off through the suction-pipe G to any convenient point of discharge. By this arrangement not only is the operation of the machine made more cleanly, healthful, and comfortable for the operator, but the accumulation of turnings around the machine is entirely avoided.

Of course the bearings are supplied with suitable oiling means; but in practice I find that the bearings give no more trouble than the bearings of mandrels of ordinary size, for while the surface speed is greatly increased the cooling effect of the air drawn through the mandrel effectually prevents the bearings becoming overheated.

What I claim as my invention is—

1. In a lathe for hollow woodenware and the like the combination of a chuck with an axial opening in its end; and a hollow mandrel communicating with the said opening, substantially as described.

2. In a lathe for hollow woodenware and the like the combination of a chuck with an axial opening in its end; a hollow mandrel communicating with the said opening; and a suction-pipe communicating with the other end of the said mandrel, substantially as described.

3. In a lathe for hollow woodenware and the like the combination of a chuck with an axial opening in its end; a hollow mandrel communicating with the said opening; and a tool-holder provided with a shield adapted to direct turnings toward the opening in the end of the chuck, substantially as described.

Toronto, April 19, 1905.

HENRY S. CANE.

In presence of—
    JOHN G. RIDOUT,
    P. R. JONES.